Figure 5:
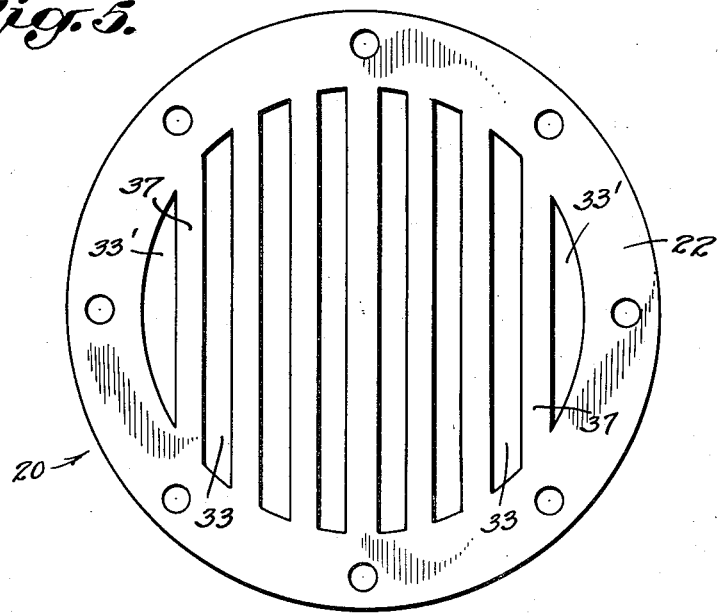

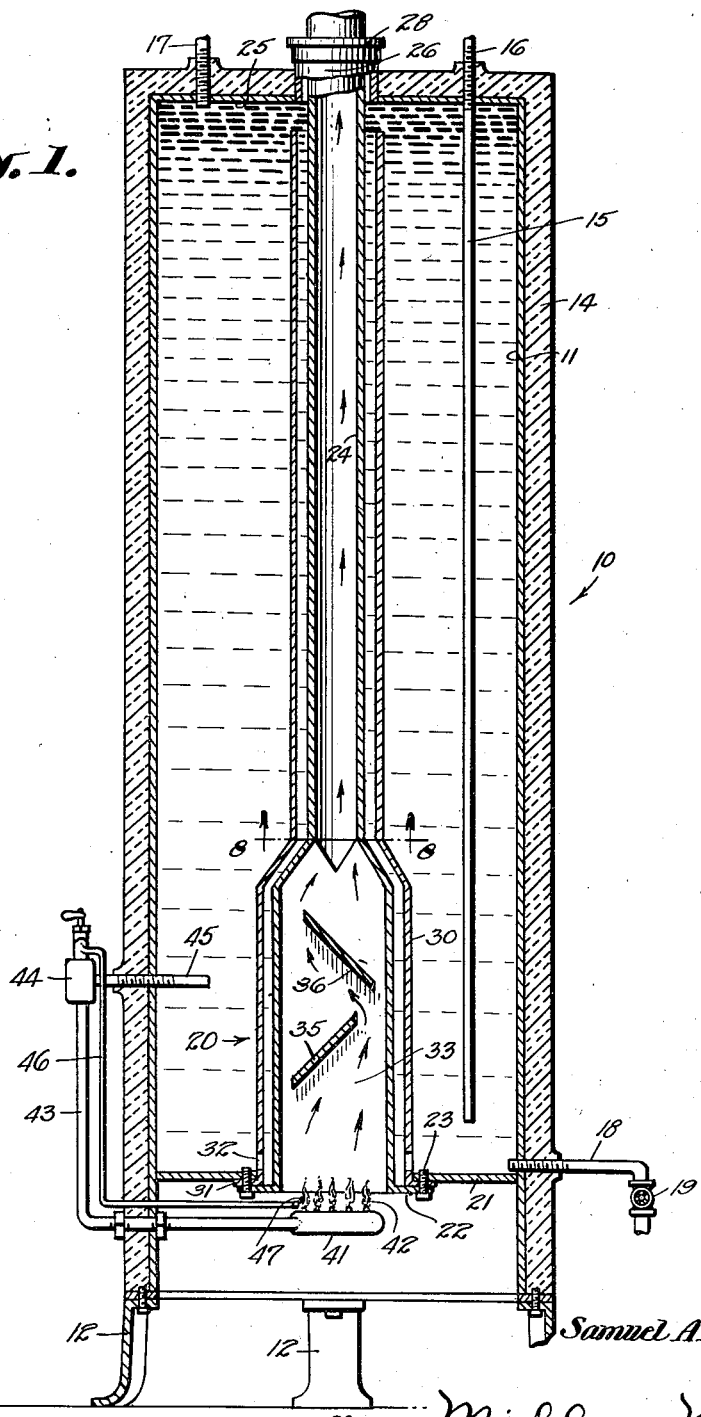

April 13, 1937.  S. A. HENDRIX  2,077,323
WATER HEATER
Filed June 29, 1935  4 Sheets-Sheet 2
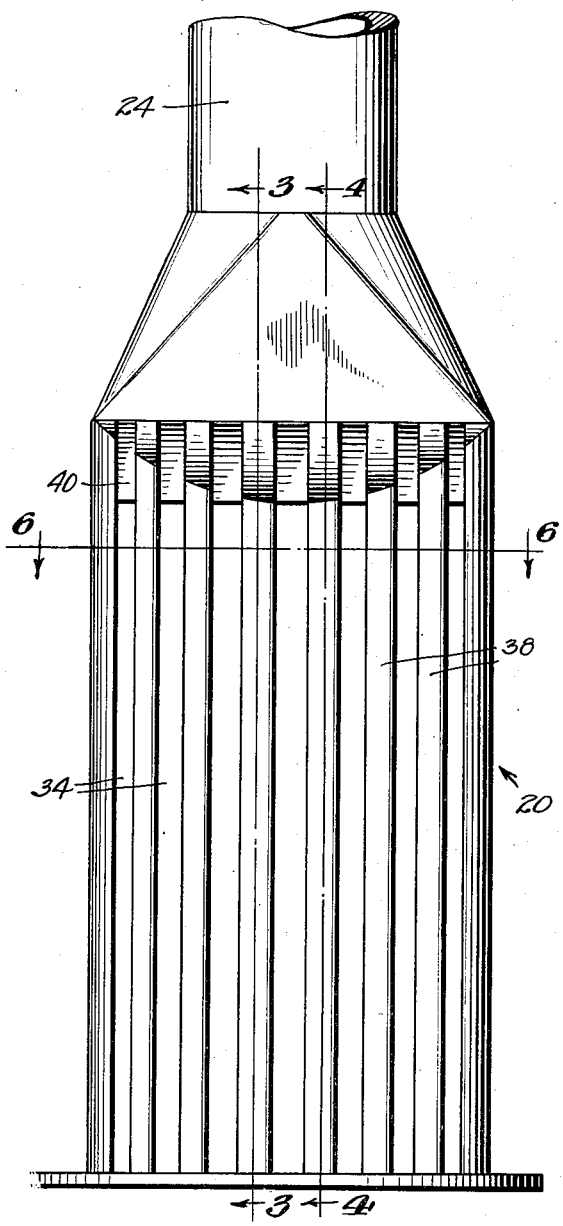
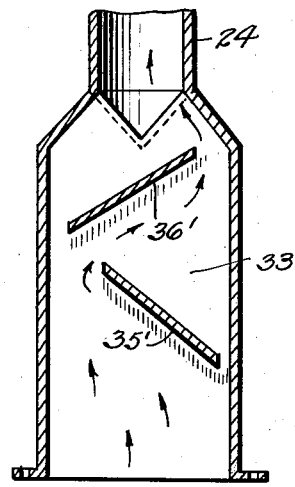
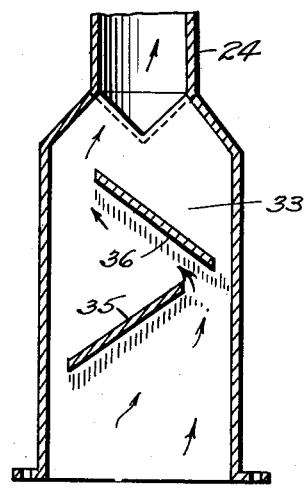
Inventor
Samuel A. Hendrix
By Miller & Miller
Attorneys April 13, 1937.  S. A. HENDRIX  2,077,323
WATER HEATER
Filed June 29, 1935   4 Sheets-Sheet 3

Inventor
Samuel A. Hendrix
By Miller & Miller
Attorneys

April 13, 1937.  S. A. HENDRIX  2,077,323
WATER HEATER
Filed June 29, 1935   4 Sheets-Sheet 4

Inventor
Samuel A. Hendrix

By Miller & Miller
Attorneys

Patented Apr. 13, 1937

2,077,323

UNITED STATES PATENT OFFICE 2,077,323

WATER HEATER

Samuel A. Hendrix, Spokane, Wash.

Application June 29, 1935, Serial No. 29,149

2 Claims. (Cl. 122—17)

This invention relates to a water heater, and has for an object to provide an improved water heater or boiler especially useful in the home for quickly and efficiently heating water at a minimum of expense, using either gas, electricity, coal fire, oil fire, or other suitable heating mediums as a source of heat.

With this invention it becomes possible to provide a combined water heater and hot water storage tank in the same space normally occupied by the storage tank alone. It also becomes possible to make the most efficient use of the heating medium, in that there is a minimum of waste of heat and a maximum of use of the heat, as a result of the manner in which the heat is transmitted from the heating medium to the water. Furthermore, instead of attempting to heat a great quantity of the water at one time, the water is exposed to the heat in a thin film and is caused to rise by thermo-conductivity in the path of the rising heat so as to heat the water most quickly and make the heated water available for immediate use. With this invention the heater unit instead of being a separate unit, is placed within the water storage tank so that the heat that is normally radiated and hence wasted in the usual water heater is, in this invention, absorbed by the surrounding body of water in the storage tank, thus preventing waste of heat unit.

Furthermore, the heater of this invention is much less expensive in construction and in operation than is the conventional types of gas heaters. To further increase the efficiency the storage tank may be covered with suitable insulating medium, although this insulating medium may be omitted if desired to cut down the expense of the installation.

As a further detail, thermostatic means exposed to the body of water in the storage tank may be used to automatically operate the heating medium as necessary in order to keep an ample supply of hot water available at all times in the storage tank.

The gases or fumes rising from the heating medium serve to further increase the temperature of the water and the fume or smoke stack will extend through the top of the storage tank, being securely fastened therethrough by an improved joint permitting necessary expansion of the smoke pipe, but preventing any leakage of water therethrough.

With the foregoing and other objects in view, as will hereinafter become apparent, this invention comprises the constructions, combinations and arrangements of parts, hereinafter set forth, disclosed and shown on the accompanying drawings.

Figure 6:
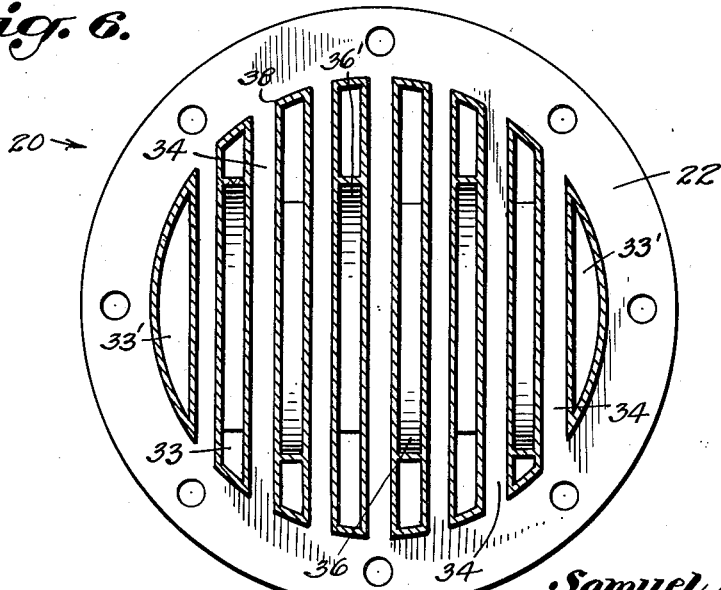
Figure 7:
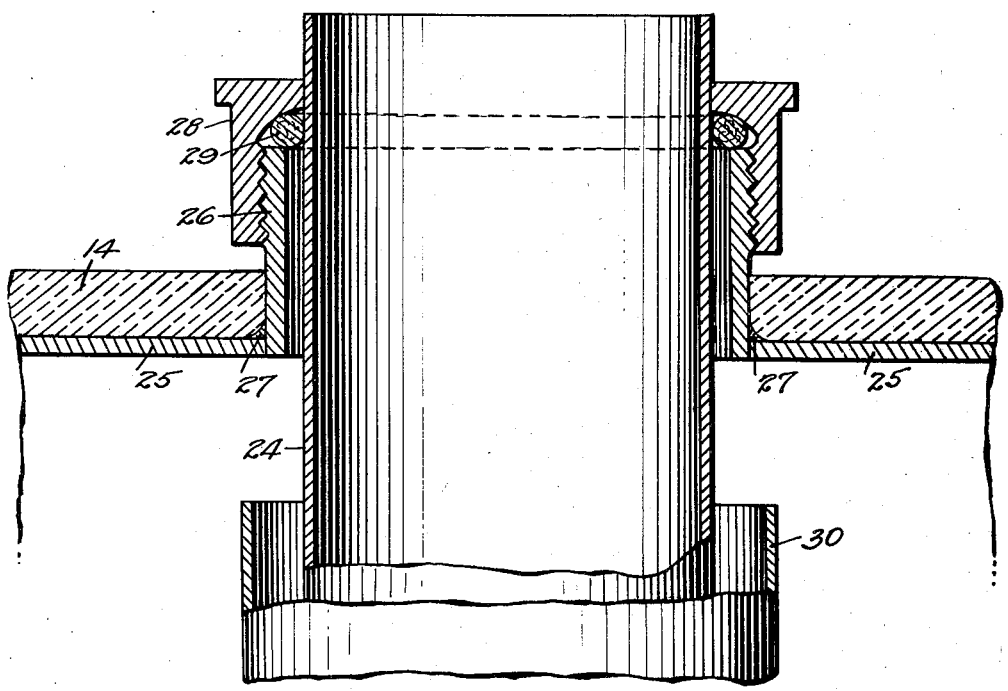
Figure 8:
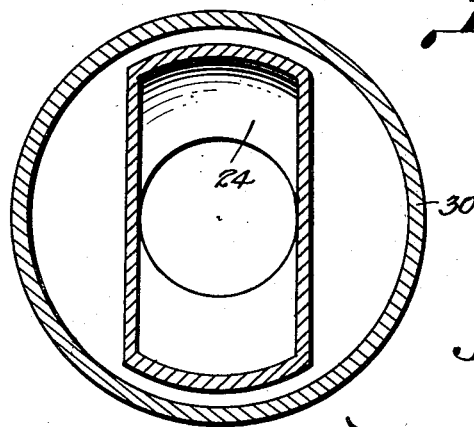

In these drawings,

Figure 1 is a vertical sectional view of a boiler showing the invention therein, Figure 2 is a side elevation of the heater, Figure 3 is a sectional view taken on the line 3—3 of Figure 2, Figure 4 is a sectional view taken on the line 4—4 of Figure 2, Figure 5 is a bottom view of the heater, Figure 6 is a sectional view taken on the line 6—6 of Figure 2, Figure 7 is an enlarged sectional view of the upper portion of the boiler, and Figure 8 is a sectional view taken on the line 8—8 of Figure 1.

There is shown at 10 the fluid or water heater and storage tank as a complete unit. This unit 10 includes a boiler, or fluid or water storage tank 11, supported by legs 12 on any suitable floor or surface 13. As shown, the storage tank 11 may be covered with any suitable insulating medium 14 so as to reduce heat losses, although, if desired, this insulating medium may be omitted to reduce the cost of installation for domestic uses.

The tank 11 is provided with the usual cold water inlet pipe 15 which is threaded through the top as at 16, and extends to near the bottom of the tank. A hot water pipe 17 is threaded through the top so as to draw off the hot water provided by this invention. Near the bottom, the usual drain pipe 18 provided with the faucet 19 is situated.

The heater unit 20, shown separately in Figure 2, is located within the storage tank 11. This heater unit 20 is secured through the bottom 21 of the storage tank 11 by means of a flange 22 bolted as at 23 to the bottom 21, suitable gasket means being provided to prevent leakage of water. Integrally cast or formed with the unit 20 is a fume or smoke pipe 24 which extends upwardly through the top 25 of the storage tank 11. In order to permit the smoke or fume pipe 24 to extend through the top 25 and prevent leakage of water, the top 25 is provided with a threaded nipple 26 which is welded thereto as at 27.

A threaded thimble 28 cooperating with the threaded nipple 26 serves to compress a packing 29 against the fume pipe 24 and prevent any possibility of leakage through the top 25. The packing 29 will preferably be of some heat resistant material such as asbestos, so as to prevent deterioration under influence of the heat radiated from the gases or fumes passing through the pipes 24.

Enclosing the heater unit 20 and the fume pipe 24 is a shell 30, the shell 30 being spaced a slight distance from the outside of the fume pipe 24 and the unit 20 and stopping short of the top 25 of the storage tank 11 a short distance so as to allow water to flow over the top thereof.

The bottom of the shell 30 is formed into a flange 31 and is held securely in position by means of the same bolt 23 between the flange 22 on heater 20 and the bottom 21. Adjacent the bottom of the shell 30 are provided a pair of entrance openings 32 so that cold water coming from the bottom of pipe 15 may enter through the openings 32 to the heater unit 20 and remain protected by the shell 30 until the water has circulated up through the heater unit 20 and around the fume pipe 24 until it has reached the top when it is again returned to the storage tank 11 and is ready to be drawn off by the hot water pipe 17.

As will be apparent, from Figures 5 and 6, the heater 20 is substantially circular in cross section and is divided into a plurality of alternate passages 33 and 34. Each of the passages 33 are open at the bottom and at the top are open to the fume pipe 24. Each passage 33 is provided with a pair of angularly disposed baffles 35 and 36, it being observed that these two baffles 35 and 36 are somewhat offset from each other so that the end of the upper baffle 36 extends further to one side than the upper end of the lower baffle 35.

These baffles 35 and 36 are provided in each of the passages 33 except the two end passages 33'. Furthermore, the baffles 35 and 36 in each alternate passage are located in the opposite angular direction as at 35' and 36', as brought out in Figures 3 and 4. The side walls of the passages 33 extend vertically straight up and down and form the side walls of the intermediate passages 34. The passages 34 are closed at their bottom as at 37, but are open along their vertical sides, as at 38. At the top the passages 34 are blocked off as at 40 from the fume pipe 24.

Located beneath the heater unit 20 is a heating means 41, here shown as constituting a gas flame 42 lit by a gas pipe 43 through a thermostat control valve 44 having a thermostat 45 extending in through the side of the storage tank 11. A pilot pipe 46 provided with a pilot flame 47 serves to automatically ignite the gas flame 42 whenever the valve 44 turns on the gas through pipe 43. Although shown as a gas heater unit 41, it is obvious that this heating means 41 may be substituted by any other suitable heating means. Thus, instead of being a gas unit, it may be a fuel oil unit, without any substantial modification. Furthermore, a coal heater unit for locations where gas or fuel oil is not available may be substituted for the gas heater unit 41 or if desired an electrical heating unit may be substituted therefor. In any case, the hot fumes or gases arising from the heater unit will enter through the passages 33 and 33'.

As the hot fumes or gases rise they will tend to heat the side walls of the passages and will strike the baffles 35, 35', 36 and 36' so as to give up further heat units which are conducted thereby to the side walls of the passages. Finally, the hot gases or fumes will enter into the fume pipe 24 and pass thereup until they are discharged above the top of the storage tank 11 in a chimney or other convenient exhaust means. By the time the hot gases or gumes have left the top of the storage tank 11, they are pretty well cooled and will have given up a maximum number of the heat units present therein either through the side walls of the passages 33 or the baffles therein or the fume pipe 24.

Water from the storage tank 11 will meantime enter through the openings 32 in the shell 30 and circulate around the heater unit 20 and through the passages 34, extracting the heat units from the side walls of the passages and rising upwardly according to the well known laws of thermo-dynamics. As the water rises from the passages 33 it will enter the space between the fume pipe 24 and the upper portion of the shell 30, which it will be noted is reduced in diameter in proportion to the reduction in diameter of the fume pipe 24 and will travel upwardly along the sides of the fume pipe 24 meantime extracting more heat units therefrom. At the same time, the shell 30 serves to prevent the heated water from being chilled by the cold water surrounding the shell and serves to concentrate a greater quantity of hot water at the top of the storage tank 11 than would be otherwise possible.

As the water continues to be heated, the level of the hot water will get lower and lower until it finally reaches the thermostat 45 and operates the thermostat control valve 44 to shut off the gas or fuel oil flowing therethrough and stop the operation of the heater unit. Likewise, should an electrical heating unit be in use, the valve 44 would then be an electric switch and operate to turn off the supply of electrical current. If a coal heating unit is being used a conventional draft control means could be operated by the thermostat 45 so as to check the operation of the coal heating unit. Then, as the hot water is drawn off through the pipe 17 in ordinary use, more cold water will enter through the pipe 15 until it reaches the level of the thermostat 45 again starting the heating unit in operation. Due to the presence of the baffles 35, 36, 35', and 36', however, the hot gases or fumes rising through the heater unit 20 will give up a maximum number of heating units, far more than is possible with any other known similar type of heater, and provide a domestic water heater of maximum efficiency.

The shell 30 will preferably be cast as a single unit and likewise the heater unit 20 and fume pipe 24 may likewise be integrally cast of a single unit, or if initially formed in separate pieces would be assembled into a single integral unit, possibly by welding or other suitable manufacturing operations so as to provide an integral one piece unit that will be leak-proof both as to fumes and as to water. As thus set forth, the entire device may be manufactured comparatively inexpensively and thus provide a domestic water heater at low cost of installation and at low cost of operation.

The absence of any tortuous bays in the side walls of the passages 33 and the presence of the baffles 35, 36, 35', and 36' serve both to decrease the cost of manufacture and to increase the efficiency of the heater. As a result of this type of construction, the walls of the passages are substantially thin, as clearly illustrated, thus both reducing the cost and amount of material that must be used and increasing the speed of transfer of heat units from the fumes or gases passing through the passages 33 to the water circulating through passages 34 and between the shell 30 and the heating unit 22.

The special type of storage container or boiler 11 may be easily formed from a conventional boiler by merely cutting suitable openings through the bottom and the top of appropriate size and inserting this mechanism therethrough, after suitably welding the threaded nipple 26 to the top thereof. As thus constructed, an inexpensive domestic water heater and storage tank is provided occupying no more space than the conventional domestic hot water tank alone and providing a heater which is of low cost to install and of low cost to operate. In addition, the insulating material or medium 14 may be placed about the tank 11 if desired to further decrease the cost of operation, although it will increase the cost of installation.

The novel features and the operation of this device will be apparent from the foregoing description. While the device has been shown, and the structure described in detail, it is obvious that this invention is not to be considered limited to the exact form disclosed, and that changes may be made therein within the scope of what is claimed without departing from the spirit of the invention.

Having thus set forth and disclosed the nature of this invention, what is claimed is:

1. In an apparatus of the class described, the combination of a storage tank for water, a heating means and a heater unit through which the heated gases or products of combustion from such heating unit pass, arranged within said tank, a series of straight closely spaced vertical walls forming part of said heater unit, each alternate pair of walls being closed along the vertical sides thereof and open at the top and bottom to provide hot gas or fume passages therethrough, whereby the water to be heated may circulate between the walls of the hot gas or fume passages to extract the heat units therefrom, each of said hot gas or fume passages being provided with a pair of angularly disposed baffles vertically spaced and offset from each other with the lower end of the upper baffle extending further to one side than the upper end of the lower baffle, a fume or hot gas pipe integrally connected to the top of the fume or hot gas passages in said heater unit, said fume pipe extending through the top of the storage tank.

2. In an apparatus of the class described, the combination of a storage tank for water, a heating means and a heater unit through which the heated gases or products of combustion from such heating unit pass, arranged within said tank, a series of straight closely spaced vertical walls forming part of said heater unit, each alternate pair of walls being closed along the vertical sides thereof and open at the top and bottom to provide hot gas or fume passages therethrough, whereby the water to be heated may circulate between the walls of the hot gas or fume passages to extract the heat units therefrom, each of said hot gas or fume passages being provided with a pair of angularly disposed baffles vertically spaced and offset from each other with the lower end of the upper baffle extending further to one side than the upper end of the lower baffle, the pair of baffles of one fume passage being oppositely angularly disposed with respect to the pair of baffles of an adjacent fume passage, a fume or hot gas pipe integrally connected to the top of the fume or hot gas passages in said heater unit, said fume pipe extending through the top of the storage tank.

SAMUEL A. HENDRIX.